(12) United States Patent
Stein

(10) Patent No.: US 7,704,384 B2
(45) Date of Patent: Apr. 27, 2010

(54) SELF DISLODGING FILTER ELEMENT

(75) Inventor: Myron Stein, Laguna Niguel, CA (US)

(73) Assignee: Air Sept, Inc., Marietta, GA (US)

( * ) Notice: Subject to any disclaimer, the term of this patent is extended or adjusted under 35 U.S.C. 154(b) by 541 days.

(21) Appl. No.: 11/265,239

(22) Filed: Nov. 2, 2005

(65) Prior Publication Data

US 2006/0102552 A1   May 18, 2006

Related U.S. Application Data

(60) Provisional application No. 60/624,315, filed on Nov. 2, 2004.

(51) Int. Cl.
  *B01D 35/14*  (2006.01)
  *B01D 29/37*  (2006.01)
  *B01D 35/28*  (2006.01)

(52) U.S. Cl. .................. 210/131; 210/130; 210/448; 210/449; 210/455; 210/483; 210/497.01

(58) Field of Classification Search ........ None
See application file for complete search history.

(56) References Cited

U.S. PATENT DOCUMENTS 4,961,849 A * 10/1990 Hull et al. ............... 210/232
6,176,093 B1 * 1/2001 Stein et al. .............. 62/85
6,423,215 B1 * 7/2002 Stein ..................... 210/131

FOREIGN PATENT DOCUMENTS

JP          402203908 A  *  8/1990

* cited by examiner

*Primary Examiner*—Krishnan S Menon
*Assistant Examiner*—Benjamin Kurtz
(74) *Attorney, Agent, or Firm*—Womble Carlyle Sandridge & Rice PLLC

(57) ABSTRACT

A self dislodging filter element, primarily for automotive applications, has a filter screen attached to an annular magnet. The filter element is installed in a port or conduit through which fluid flows and is held in place with magnetic attraction. If the filter screen becomes too clogged, pressure from the fluid impinging on the clogged screen overcomes the magnetic attraction and the filter slides down the conduit to be deposited in a repository and out of the fluid flow path.

18 Claims, 3 Drawing Sheets

SELF DISLODGING FILTER ELEMENT

CROSS-REFERENCE TO RELATED APPLICATION

The present patent application is a formalization of a previously filed, co-pending provisional patent application entitled "Self-Dislodging Filter Element," filed Nov. 2, 2004, as U.S. Patent Application Ser. No. 60/624,315 by the inventors named in this patent application. This patent application claims the benefit of the filing date of the cited provisional patent application according to the statutes and rules governing provisional patent applications, particularly 35 USC §119 (e)(1) and 37 CFR §§1.78(a)(4) and (a)(5). The specification and drawings of the provisional patent application are specifically incorporated herein by reference.

FIELD OF THE INVENTION

The present invention relates to filer elements for an automotive applications. More particularly, the present invention relates to a self-dislodging filter for use in systems having pressurized fluid flow.

BACKGROUND OF THE INVENTION

Automotive systems such as air conditioning systems, power steering systems, and the like employ circulating pressurized fluid. The fluid can become contaminated with small particles, so filter elements, such as thimble filters, sometimes are employed in the fluid path to trap contaminates. One problem with such filters is that they can sometimes become clogged, thereby restricting fluid flow and degrading system performance. Various filter units employing some form of automatic bypass in a clogged filter condition have been employed, but most are complicated and can be unreliable. A need exists for a simple filter system that, when clogged, takes itself out of the fluid flow to prevent constriction or restriction of the flow. It is to the provision of such a filter system that this invention is primarily directed.

SUMMARY OF THE INVENTION

The present invention is directed to a self-dislodging filter element that can be used to trap contaminants in systems having pressurized fluid flow such as in automotive power steering systems and automatic transmissions. When the filter element becomes clogged and starts to restrict fluid flow in the conduit, the fluid pressure exerted on the filter element increases and overcomes the magnetic force holding the filter element in place in the conduit.

In one aspect of the invention, a self-dislodging filter assembly is provided for use in a conduit, such as a fluid inlet or fluid tube. The filter assembly includes a filter mesh element for trapping a plurality of contaminants in a fluid flowing in the conduit, and an annular-shaped magnet that embeds the filter mesh element to form the filter assembly. The magnet adheres to the walls of the conduit and holds the filter assembly securely in place in the conduit. The filter assembly remains in place until fluid pressure impinging on the filter is sufficient to dislodge the filter assembly from the conduit walls. This occurs when the filter assembly becomes clogged. The filter mesh element can be thimble-shaped and have an open end for trapping contaminants.

In another aspect of the invention, a self-dislodging filter element is provided for use in an automotive system having a pressurized fluid flow, such as a power steering system, an automatic transmission system, or an air conditioning system. A filter mesh element traps contaminants in the fluid flowing in an inlet section of the automotive system. The filter mesh element is attached to an annular-shaped magnet at an open end of the mesh element to form the filter assembly. The magnet adheres the filter assembly to the inlet section or port in operation until the fluid pressure impinging on the filter assembly dislodges the filter assembly. The fluid pressure increases during operation as the filter element gets clogged with contaminants.

BRIEF DESCRIPTION OF THE DRAWINGS

The invention is better understood by reading the following detailed description of the invention in conjunction with the accompanying drawings.

DETAILED DESCRIPTION OF THE INVENTION

The following description of the invention is provided as an enabling teaching of the invention in its best, prominently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

One application of the filter element assembly of the present invention is in power steering systems for automotive vehicles that include a pump for supplying hydraulic fluid under pressure to a power steering gear assembly. Solid particles resulting from wear of the system parts are present in the fluid causing contamination, increased friction, and higher fluid temperatures. These particles also cause deterioration of the hoses and seals in the system. The filter element assembly of the invention is positioned over the fluid inlet inside the pump and filters such particles to reduce fluid contamination. The mesh screen of the filter element is insert-molded into the magnet when the magnet is formed. In use, if the mesh screen gets clogged with contaminants, the pressure pops the assembly from the fluid inlet.

Figure 1C:
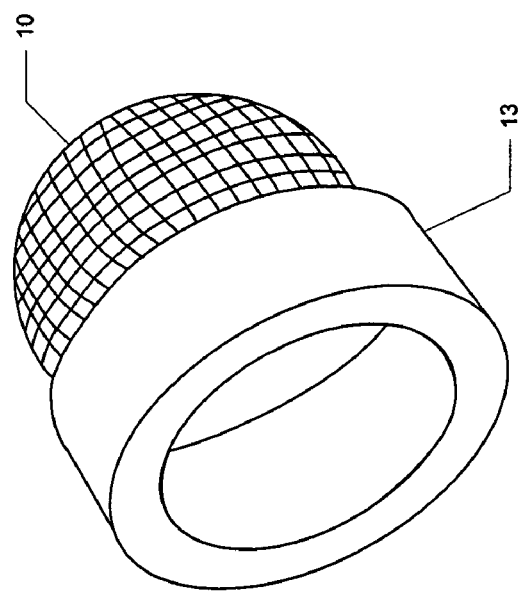
FIGS. 1A-1C illustrate plan, side and perspective views of the self-dislodging filter element assembly in accordance with an exemplary embodiment of the invention.
Figure 1B:
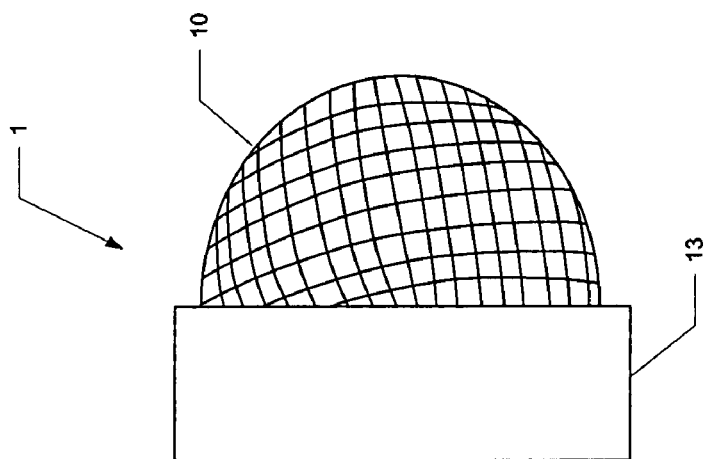
Figure 1A:
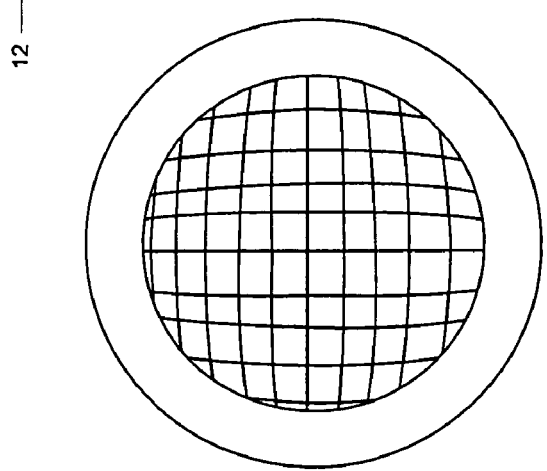
Figure 2C:
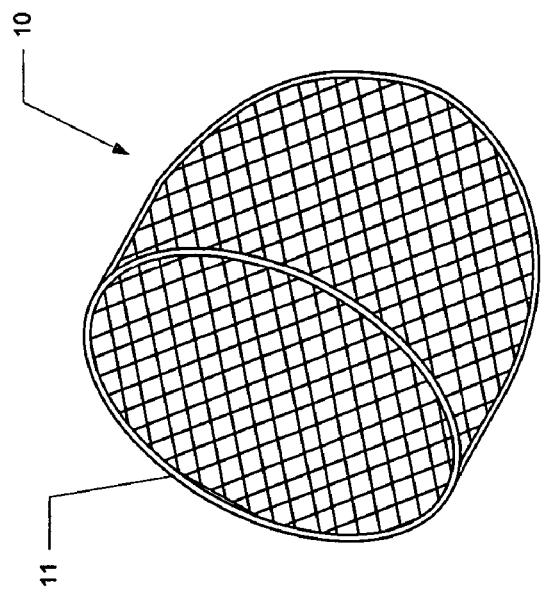
FIGS. 2A-2C illustrate plan, side and perspective views of the filter mesh in accordance with an exemplary embodiment of the invention.
Figure 2B:
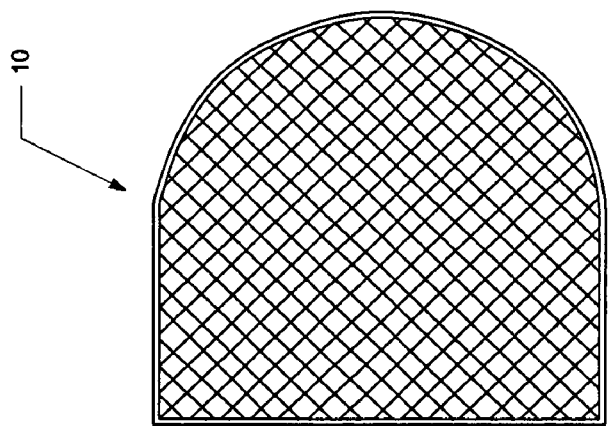
Figure 2A:
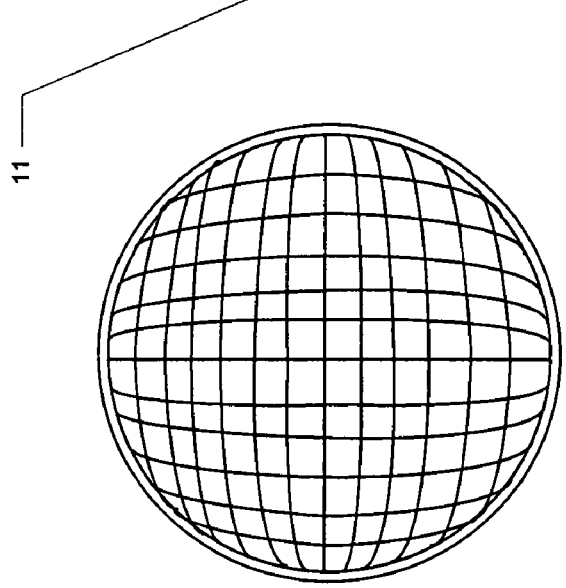

Referring now in more detail to the drawings, a thimble filter system 1 comprises a traditional woven thimble-shaped filter mesh 10 having an open end portion 11. A thimble filter element is open at one end and closed at the other end. FIGS. 1A-1C illustrate plan, side and perspective views of the self-dislodging filter element assembly. The open end portion 11 of the filter system 1 is embedded within or otherwise fixed to an annular magnet 12. The filter mesh element can be molded into the magnet. The annular magnet can be formed by injection molding and can be either a metallic or plastic magnet. The outermost rim of the magnet 12 extends beyond the surface of the filter mesh to a relatively smooth outer surface 13. FIGS. 2A-2C illustrate plan, side and perspective views of the filter mesh.

Figure 3C:
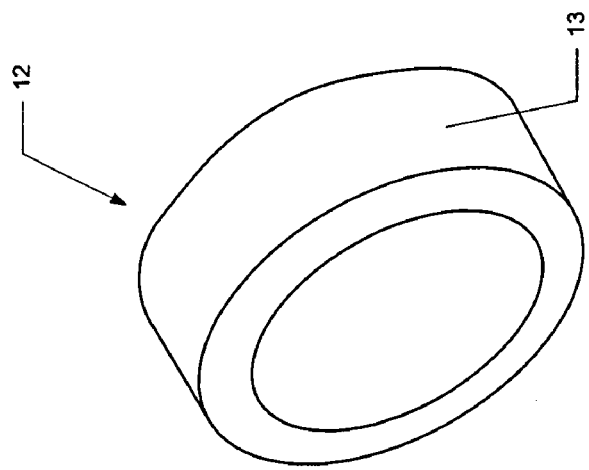
FIGS. 3A-3C illustrate side, plan and perspective views of the filter element magnet in accordance with an exemplary embodiment of the invention.
Figure 3B:
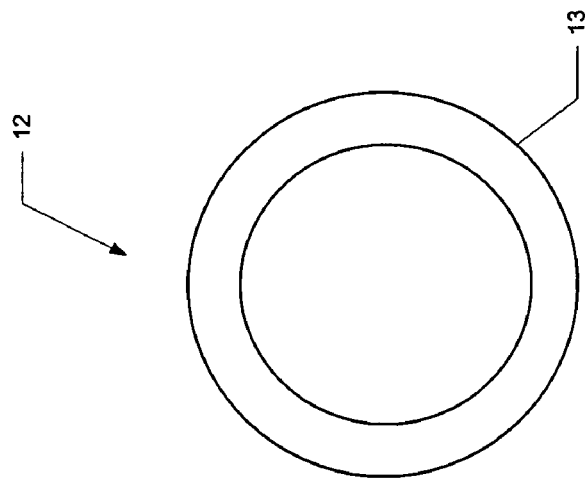
Figure 3A:
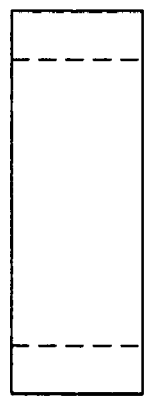

FIGS. 3A-3C illustrate side, plan and perspective views of the filter element magnet. The annular magnet 12 is sized so that it fits relatively snuggly, but nevertheless slidably, inside a fluid inlet port, fluid tube, or other conduit through which fluid flows. The strength of the magnet is carefully predetermined for a particular system such that as long as the filter is not clogged, the magnet holds the filter element securely in place in the conduit through magnetic attraction with the walls of the conduit. However, if the filter element becomes sufficiently clogged to effect fluid flow adversely, the fluid pressure generated by the fluid impinging on the clogged filter creates a force sufficient to overcome the magnetic attraction. When that occurs, the filter element slides along the length of the conduit to a point where it safely falls out of the fluid flow path. In the case of a power steering pump, for example, it may simply slide down the walls of an inlet port until it falls harmlessly into the fluid reservoir of the pump. Where there is no such natural reservoir to receive the spent filter element, an ancillary reservoir may be installed just downstream of the location of the filter element. In that event, the filter element, when clogged, slides down its conduit until it encounters and falls in the installed reservoir. In either event, the clogged filter element moves out of the path of the fluid flow so that it cannot adversely restrict the flow. A new filter can be installed simply by exposing the inlet port or other conduit and slipping in a new clean filter element.

Recent scientific breakthroughs in the field of materials science has led to the development of plastic magnets which are used in an exemplary embodiment of the invention. In conventional magnets, magnetism is the result of electron spins lining up. Certain organic polymers have been found that have the propensity to form charged particles called free radicals. An increase in the alignment of polymer chains probably accounts for the increase in magnetism shown by certain polymers. The nature of polymer synthesis means that magnetic properties could be made to measure by varying the proportions of the initial chemicals. Injection-molded magnets can be formed into various shapes without costly machining steps.

Although the present invention has been described with respect to a power steering system embodiment, the self-dislodging filter can be used in other applications such as automatic transmissions of automobiles and other motor-driven equipment in which it is desirable to remove the fine contaminants particles accumulating in the fluid.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. A self dislodging filter assembly comprising:
    a thimble shaped filter mesh element having an open end portion for trapping a plurality of contaminants in a fluid flowing in a conduit;
    a reservoir disposed downstream of the conduit and in fluid communication with the conduit; and
    an annular-shaped magnet that embeds the filter mesh element at the open end portion to form a filter, the magnet having a predetermined magnetic field strength to hold the filter in place in the conduit, wherein the magnet adheres the filter to an interior wall of the conduit and secures the filter in place in the conduit, the filter remaining in place until a fluid pressure impinging on the filter is sufficient to overcome the magnetic field strength causing the filter to dislodge from the interior conduit wall and travel downstream in the fluid flow, and drop into the fluid reservoir and out of the fluid flow.

2. The self dislodging filter assembly of claim 1 wherein the filter mesh element comprises a woven material.

3. The self dislodging filter assembly of claim 1 wherein the conduit is a fluid inlet port.

4. The self dislodging filter assembly of claim 1 wherein the conduit is a fluid tube.

5. The self dislodging filter assembly of claim 1 wherein the magnet is metallic.

6. The self dislodging filter assembly of claim 1 wherein the magnet is non-metallic.

7. The self dislodging filter assembly of claim 1 wherein the magnet is formed from organic polymers.

8. The self dislodging filter assembly of claim 1 wherein the magnet is injection-molded.

9. The self dislodging filter assembly of claim 1 wherein the filter mesh element is molded into the magnet.

10. The self dislodging filter assembly of claim 1 wherein the filter slides along the conduit when it is dislodged by the fluid pressure impinging on the filter.

11. A self dislodging filter assembly, comprising:
    a tubular filter mesh element having an open end portion for trapping a plurality of contaminants in a fluid flowing in an inlet section of an automotive system having pressurized fluid flow;
    a fluid reservoir disposed downstream of the inlet section in a conduit, the fluid reservoir being in fluid communication with the conduit and being sized to receive and contain the filter mesh element; and
    an annular-shaped magnet that is attached at the open end portion of the filter mesh element to form a filter, the magnet having a predetermined magnetic field strength to secure the filter in place in the inlet section, wherein the magnet adheres the filter to an interior wall of the inlet section and secures the filter in place until fluid pressure impinging on the filter overcomes the magnetic field strength and dislodges the filter from the interior wall of the inlet section, and the filter is received by the fluid reservoir to move the filter out of the fluid flow.

12. The self dislodging filter assembly of claim 11 wherein the filter mesh element comprises a woven material.

13. The self dislodging filter assembly of claim 11 wherein the magnet is injection-molded.

14. The self dislodging filter assembly of claim 11 wherein the filter mesh element is molded into the magnet.

15. The self dislodging filter assembly of claim 11 wherein the filter slides along the conduit when it is dislodged by the fluid pressure impinging on the filter.

16. The self dislodging filter assembly of claim 13 wherein the magnet comprises organic polymers.

17. The self dislodging filter assembly of claim 11 wherein the automotive system comprises at least one of a power steering system, an automatic transmission system and an air conditioning system.

18. A fluid flow system comprising:
  a fluid conduit having an inlet end;
  a thimble shaped filter at the inlet end for filtering fluid flowing through the conduit, the filter including a magnet designed to hold the filter in place at the inlet end when the filter is not clogged and to detach and free the filter from the inlet end when the filter is clogged; and
  a reservoir downstream of the inlet and in communication with the fluid conduit, the reservoir being sized and configured to receive the clogged filter when it is detached from the inlet end and move the clogged filter out of the fluid flow.

\* \* \* \* \*